United States Patent
Achilles et al.

(10) Patent No.: US 11,569,769 B2
(45) Date of Patent: Jan. 31, 2023

(54) SYSTEM AND METHOD FOR CONTROLLING DRIVETRAIN DAMPING DURING MULTIPLE LOW-VOLTAGE RIDE THROUGH EVENTS

(71) Applicant: General Electric Renovables Espana, S.L., Barcelona (ES)

(72) Inventors: Alfredo Sebastian Achilles, Niskayuna, NY (US); Miriam Monros Garrigosa, Barcelona (ES); Nithya Anand, Bangalore (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/470,008

(22) Filed: Sep. 9, 2021

(65) Prior Publication Data
US 2022/0077797 A1    Mar. 10, 2022

(30) Foreign Application Priority Data
Sep. 10, 2020   (IN) .............................. 202011039168

(51) Int. Cl.
*F03D 9/00*    (2016.01)
*H02P 9/04*    (2006.01)
(Continued)

(52) U.S. Cl.
CPC .............. *H02P 9/102* (2013.01); *F03D 13/20* (2016.05); *F03D 15/00* (2016.05); *H02K 7/1838* (2013.01);
(Continued)

(58) Field of Classification Search
CPC .... F03D 13/20; F03D 15/00; F05B 2240/912; F05B 2260/4031; H02K 7/1838; H02P 9/102
See application file for complete search history.

(56) References Cited

U.S. PATENT DOCUMENTS 2,315,468 A * 3/1943 Van Warrington .. H02H 1/0046
                                                361/80
5,194,801 A * 3/1993 Rozman .................. H02P 9/102
                                                322/25
(Continued)

FOREIGN PATENT DOCUMENTS

EP      2865889 B1    1/2018
IN   201821034490 A   3/2020

OTHER PUBLICATIONS

EP Search Report for EP application No. 21194391.5, dated Feb. 14, 2022.

*Primary Examiner* — Tulsidas C Patel
*Assistant Examiner* — Thomas K Quigley
(74) *Attorney, Agent, or Firm* — Dority & Manning, P.A.

(57) ABSTRACT

A method for operating a power generation system having a drivetrain connected to an electrical grid during one or more grid transient events includes receiving an indication of the one or more grid transient events occurring in the electrical grid. The method also includes selecting between a first set of drivetrain damping control settings or a different, set second set of drivetrain damping control settings based on the indication. The first set of drivetrain damping control settings is for handling a single, first grid transient event, whereas the second set of drivetrain damping control settings is for handling additional, subsequent grid transient events following the first transient event. The method also includes controlling the power generation system based on the selected first or second sets of the drivetrain damping control settings such that the power generation system can remain connected to the electrical grid during the grid transient event(s).

20 Claims, 8 Drawing Sheets

(51) Int. Cl.
*H02P 9/10* (2006.01)
*F03D 13/20* (2016.01)
*F03D 15/00* (2016.01)
*H02K 7/18* (2006.01)

(52) U.S. Cl.
CPC . *F05B 2240/912* (2013.01); *F05B 2260/4031* (2013.01); *F05B 2260/964* (2013.01)

(56) References Cited

U.S. PATENT DOCUMENTS

| | | | |
|---|---|---|---|
| 7,411,309 B2* | 8/2008 | Hudson | F03D 7/0272 |
| | | | 290/55 |
| RE43,698 E* | 10/2012 | Hudson | H02P 9/46 |
| | | | 290/55 |
| 9,041,234 B2* | 5/2015 | Lu | H02P 9/007 |
| | | | 290/44 |
| 9,528,495 B2 | 12/2016 | Lopez Rubio et al. | |
| 9,590,547 B2* | 3/2017 | Lu | H02H 7/06 |
| 9,590,549 B2* | 3/2017 | Damen | F03D 7/0288 |
| 10,364,798 B2 | 7/2019 | Kjaer et al. | |
| 2007/0052244 A1* | 3/2007 | Hudson | H02P 9/102 |
| | | | 290/44 |
| 2012/0310426 A1 | 12/2012 | Tamowski | |
| 2013/0249501 A1* | 9/2013 | Lu | F03D 7/0224 |
| | | | 322/21 |
| 2015/0008673 A1* | 1/2015 | Damen | H02P 9/102 |
| | | | 290/44 |
| 2015/0229257 A1* | 8/2015 | Lu | H02P 9/006 |
| | | | 322/21 |
| 2015/0333501 A1 | 11/2015 | Geisler et al. | |
| 2015/0381089 A1 | 12/2015 | Tamowski et al. | |

* cited by examiner

SYSTEM AND METHOD FOR CONTROLLING DRIVETRAIN DAMPING DURING MULTIPLE LOW-VOLTAGE RIDE THROUGH EVENTS

FIELD

The present disclosure relates generally power generation systems and more particularly to systems and methods for controlling drivetrain damping of power generation systems during multiple low-voltage ride through events.

BACKGROUND

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

In order to supply power to the electrical grid, wind turbines need to conform to certain requirements. For example, wind turbines may need to offer fault ride through (e.g. low voltage ride through, zero voltage ride through, high voltage ride through, etc.) capability, which requires a wind turbine to stay connected to the electrical grid during one or more grid events corresponding to a change in the magnitude of grid voltage for a time duration. For example, when a low voltage ride through grid event occurs, voltage in the system can decrease by a significant amount for a short duration (e.g. typically less than 500 milliseconds).

In the past, during such grid events, it has been acceptable for a wind turbine to be immediately disconnected whenever the voltage reduction occurs. However, as wind turbines continue to increase in size and penetration of wind turbines on the grid increases, it is desirable for the wind turbines to remain online and ride through such disturbances.

In particular, for low voltage ride through conditions, the wind turbine must continue to operate without tripping while also meeting power requirements and ensuring the wind turbine integrity. However, with more restrictive power response requirements, it is more difficult to keep mechanical loads within limits. For example, a controller configuration for the wind turbine that provides acceptable power response performance may result in a mechanical loads exceedance or tripping of the wind turbine, especially for multiple fault ride through events.

Accordingly, a system and method for operating the wind turbine during one or more low voltage ride through events that addresses the aforementioned issues would be welcomed in the art. In particular, the present disclosure is directed to systems and methods for using different drivetrain damping configurations of the wind turbine for single and multiple low-voltage ride through events.

BRIEF DESCRIPTION

Aspects and advantages of embodiments of the present disclosure will be set forth in part in the following description, or may be learned from the description, or may be learned through practice of the embodiments.

In one aspect, the present disclosure is directed to a method for operating a power generation system having a drivetrain connected to an electrical grid during one or more grid transient events. The method includes receiving, via a controller, an indication of the one or more grid transient events occurring in the electrical grid. The method also includes selecting between a first set of drivetrain damping control settings or a different, set second set of drivetrain damping control settings for the power generation system based on the indication. The first set of drivetrain damping control settings is for handling a single, first grid transient event of the one or more grid transient events, whereas the second set of drivetrain damping control settings is for handling additional, subsequent grid transient events following the first transient event. The method also includes controlling, via the controller, the power generation system based on the selected first or second sets of the drivetrain damping control settings such that the power generation system can remain connected to the electrical grid during the one or more grid transient events.

In an embodiment, the grid transient event(s) may include, for example, one or more low voltage ride through events or one or more zero voltage ride through events.

In another embodiment, receiving the indication of the grid transient event(s) occurring in the electrical grid may include receiving a first indication of a single, first grid transient event, waiting a certain time period, and receiving a second indication of whether the single, first grid transient event is isolated or followed by additional, subsequent grid transient events.

In further embodiments, selecting between a first set of drivetrain damping control settings or a different, set second set of drivetrain damping control settings for the power generation system based on the indication may include determining whether the second indication is indicative of the single, first grid transient event being isolated or is followed by the additional, subsequent grid transient events and selecting between the first and second sets of the drivetrain damping control settings based on the determination.

In additional embodiments, the first set of drivetrain damping control settings for handling the single, first grid transient event include control settings selected to orient to prioritize power performance. Moreover, in certain embodiments, the different, second set of drivetrain damping control settings for handling additional, subsequent grid transient events following the first transient event may include control settings selected to orient to prioritize reduction of mechanical loads of the drivetrain.

In particular embodiments, the first and second sets of drivetrain damping control settings may include at least one of a gain or a limit of the controller. Thus, in such embodiments, the method may include tuning at least one of the gain or the limit of the controller based on the selected first or second sets of drivetrain damping control settings.

In several embodiments, for the first set of drivetrain damping control settings, the method may include applying upper and lower limits to the controller, reducing the gain to zero, and then subsequently gradually increasing the gain thereafter. Further, for the second set of drivetrain damping control settings, the method may include applying upper and lower limits to the controller and setting the gain to at least one (1).

In yet another embodiment, the power generator system may include a wind turbine power system.

In another aspect, the present disclosure is directed to a method for operating a power generation system having a drivetrain connected to an electrical grid during one or more grid transient events. The method includes receiving, via a controller, an indication of the one or more grid transient events occurring in the electrical grid. Further, the method includes activating a drivetrain damping algorithm programmed in the controller of the power generation system to control a torque level of the power generation system during the one or more grid transient events. The drivetrain damping algorithm includes, at least, a first mode defining a first set of drivetrain damping control settings for handling a single, first grid transient event and a second mode defining a different, second set of drivetrain damping control settings for handling additional, subsequent grid transient events of following the first transient event. The method also includes operating, via the controller, the power generation system in at least one of the first mode or the second mode depending upon whether the one or more grid transient events comprises only the first grid transient event or the additional, subsequent grid transient following the first transient event.

In yet another aspect, the present disclosure is directed to a wind turbine power system connected to an electrical grid. The wind turbine power system includes a tower, a nacelle mounted atop the tower, a rotor having a rotatable hub with at least one rotor blade mounted thereto, a drivetrain mechanically coupled to the rotor and having, at least, a rotor shaft, a gearbox, and a generator, and a controller configured to perform a plurality of operations. The plurality of operations include, but are not limited to receiving an indication of the one or more grid transient events occurring in the electrical grid, selecting between a first set of drivetrain damping control settings or a different, set second set of drivetrain damping control settings for the power generation system based on the indication, the first set of drivetrain damping control settings for handling a single, first grid transient event of the one or more grid transient events and the second set of drivetrain damping control settings for handling additional, subsequent grid transient events following the first transient event, and controlling the power generation system based on the selected first or second sets of the drivetrain damping control settings such that the power generation system can remain connected to the electrical grid during the one or more grid transient events. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to controlling operation of a wind-driven power generation system (e.g. a wind turbine power system) based at least in part on grid conditions associated with an electrical grid coupled to the system. In particular, when a transient grid event associated with a drop in voltage at the grid, such as a low voltage ride through (LVRT) event or a zero voltage ride through (ZVRT) event is detected, systems and methods of the present disclosure can use different controller configurations for single LVRT events and multiple events. More specifically, the present disclosure may use a drivetrain damping algorithm (which is generally tuned for normal operation based on drivetrain oscillations damping) to respond to single or multiple grid events differently. For example, in an embodiment, for the first voltage drop, the controller settings can be oriented to prioritize power performance, whereas from the second voltage drop onwards, the controller settings can be oriented to prioritize reduction of mechanical loads. Such a control strategy can be completed because single voltage drops are far more likely to occur in a utility grid and the risk of excessive mechanical load solicitations is higher with multiple events.

As such, the present disclosure has many advantages not present in the prior art. For example, managing actuation of the drivetrain damping algorithm during and after LVRT/MFRT events can ensure wind turbine integrity and can ensure grid compliance in many jurisdictions.

Figure 1:
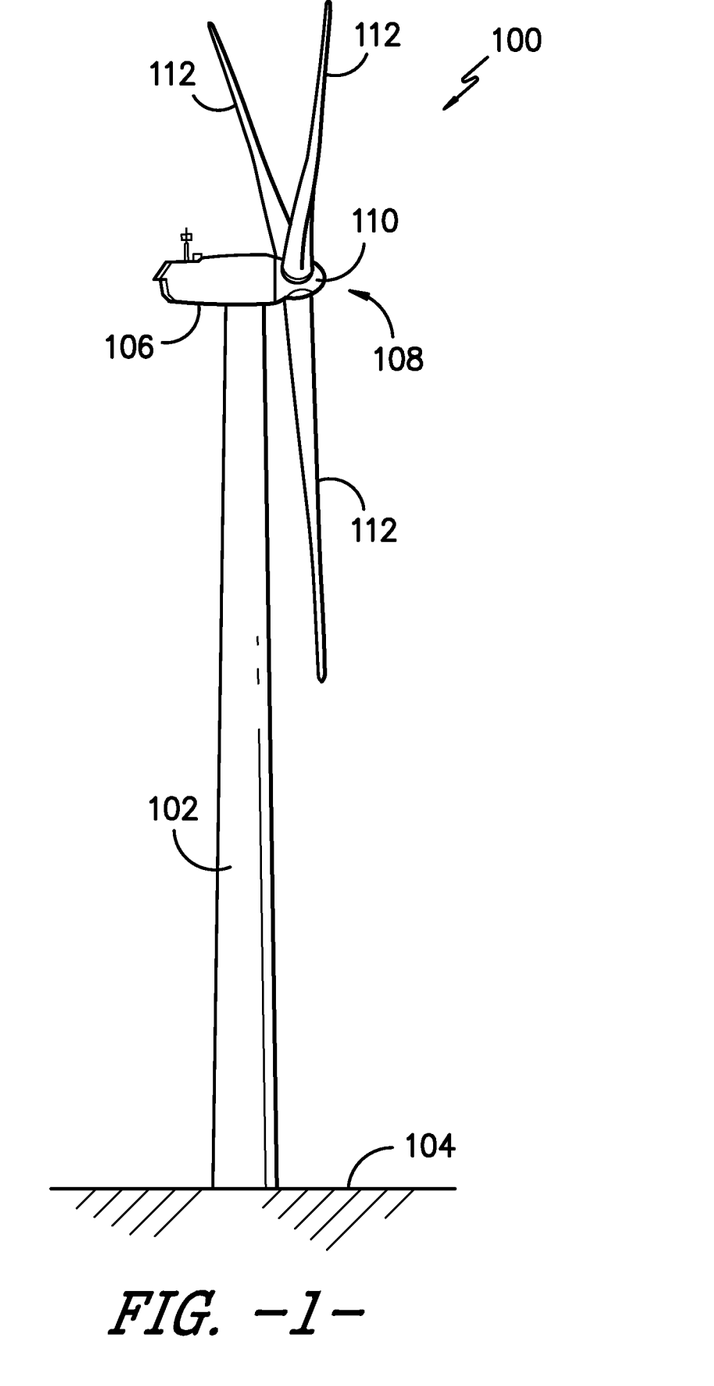
FIG. 1 illustrates a perspective view of one embodiment of a wind turbine according to the present disclosure.

Referring now to the drawings, FIG. 1 illustrates a perspective view of one embodiment of a wind turbine 100. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, as will be described below, the rotor 108 may be rotatably coupled to an electric generator 220 (FIG. 2) to permit electrical energy to be produced.

Figure 2:
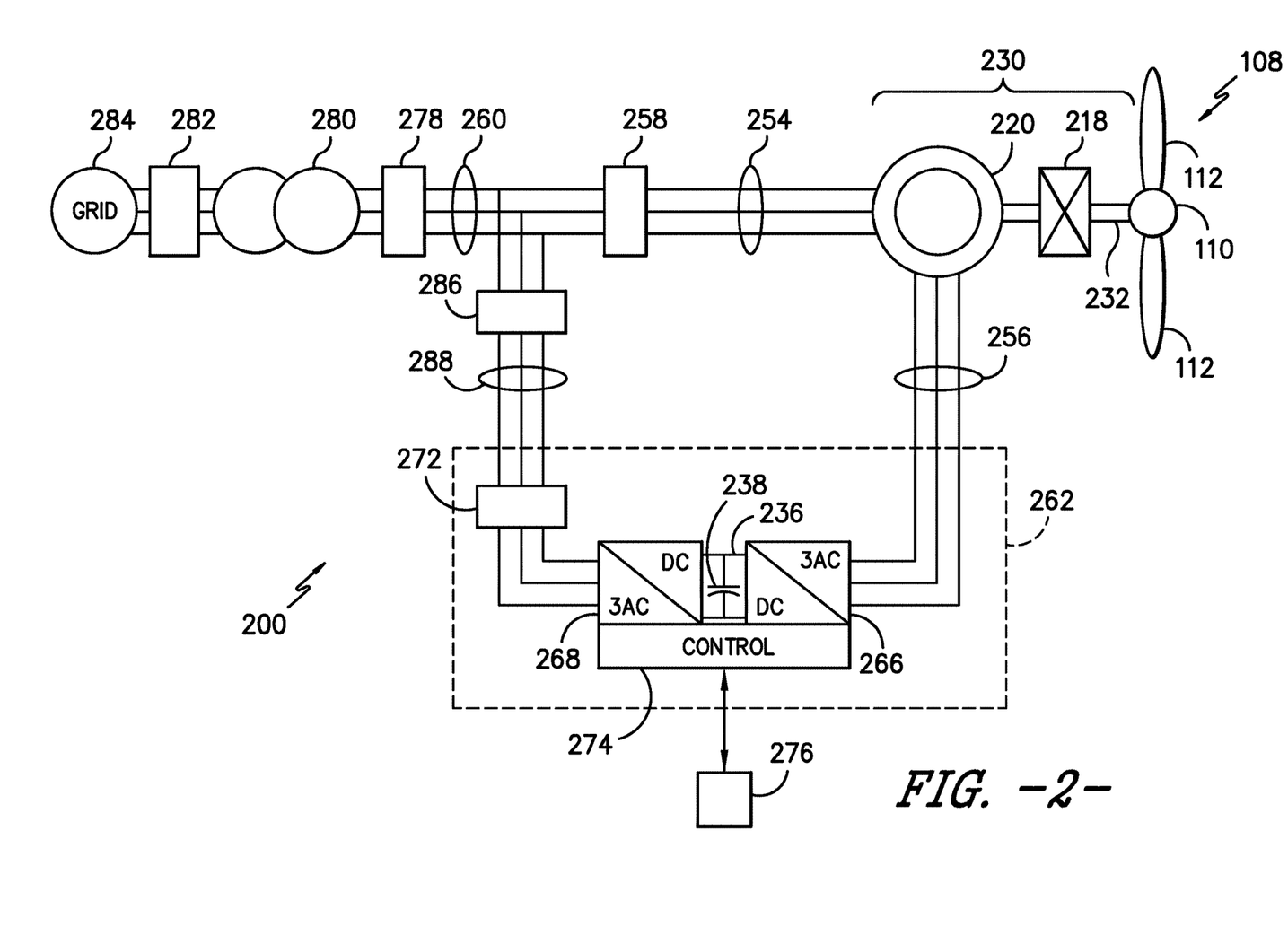
FIG. 2 illustrates a schematic diagram of one embodiment of a wind-driven power generation system according to the present disclosure.

Referring now to FIG. 2, a schematic diagram of one embodiment of a DFIG wind turbine system 200 is illustrated in accordance with aspects of the present subject matter. It should be appreciated that the present subject matter will generally be described herein with reference to the system 200 shown in FIG. 2. However, those of ordinary skill in the art, using the disclosures provided herein, should understand that aspects of the present disclosure may also be applicable in other power generation systems.

Figure 5:
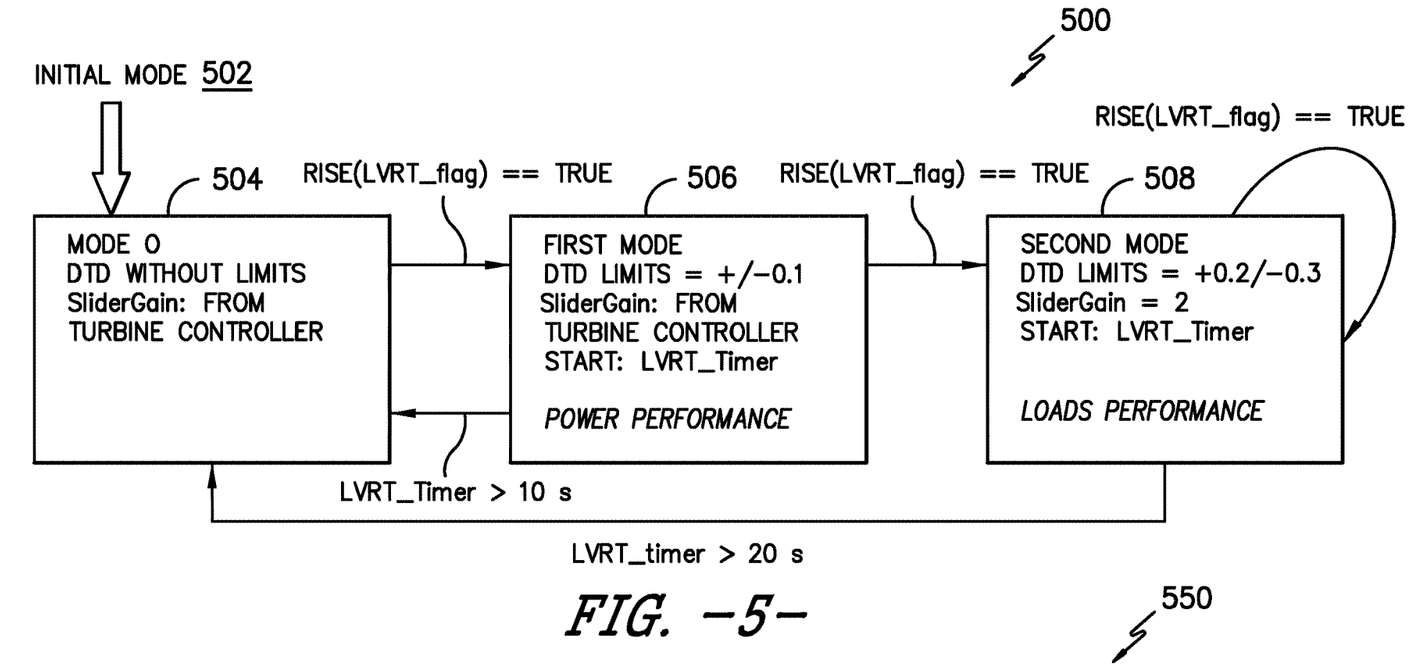
FIG. 5 illustrates a schematic diagram of one embodiment of a drivetrain damping algorithm that may be implemented by the controller according to the present disclosure.

As shown, the rotor 108 of the wind turbine 100 is coupled to a drivetrain 230, which generally includes a rotor shaft 232 coupled to an optional gearbox 218, which is, in turn, coupled to a generator 220. In accordance with aspects of the present disclosure, the generator 220 may be a doubly-fed induction generator (DFIG). For example, as shown, the DFIG 220 may be coupled to a stator bus 254 and a power converter 262 via a rotor bus 256. The stator bus 254 may provide an output multiphase power (e.g. three-phase power) from a stator of the DFIG 220 and the rotor bus 256 may provide an output multiphase power (e.g. three-phase power) from a rotor of the DFIG 120. As shown in FIG. 5, the power converter 262 includes a rotor side converter 266 and a line side converter 268. The DFIG 220 may be coupled via the rotor bus 256 to the rotor side converter 266. Additionally, the rotor side converter 266 may be coupled to the line side converter 268 which may, in turn, be coupled to a line side bus 288. In particular embodiments, the power converter 262 may be a multi-level bridge power converter, such as a three-level bridge power converter, or higher. As described herein, three-level converters are converters that have three direct current (DC) poles. In addition to positive and negative DC poles, such converters also have a neutral DC pole.

In several embodiments, the rotor side converter 266 and the line side converter 128 may be configured for normal operating mode in a three-phase, pulse width modulation (PWM) arrangement using insulated gate bipolar transistor (IGBT) switching elements as will be discussed in more detail with respect to FIG. 3. The rotor side converter 126 and the line side converter 268 may be coupled via a DC link 126 across which is a DC link capacitor 238.

In addition, the power converter 262 may be coupled to a converter controller 274 in order to control the operation of the rotor side converter 266 and the line side converter 268. It should be noted that the converter controller 274 may, in several embodiments, be configured as an interface between the power converter 262 and a control system 276, such as turbine controller. The converter controller 274 may include any number of control devices. In one embodiment, the converter controller 274 may include a processing device (e.g. microprocessor, microcontroller, etc.) executing computer-readable instructions stored in a computer-readable medium. The instructions when executed by the processing device may cause the processing device to perform operations, including providing control commands to the switching elements and/or the shorting devices of the power converter 262.

In typical configurations, various line contactors and circuit breakers including, for example, a grid breaker 282 may also be included for isolating the various components as necessary for normal operation of the DFIG 220 during connection to and disconnection from the electrical grid 284. For example, a system circuit breaker 278 may couple the system bus 260 to a transformer 280, which may be coupled to the electrical grid 284 via the grid breaker 282. In alternative embodiments, fuses may replace some or all of the circuit breakers.

In operation, alternating current power generated at the DFIG 220 by rotating the rotor 108 is provided via a dual path to the electrical grid 284. The dual paths are defined by the stator bus 254 and the rotor bus 256. On the rotor bus side 256, sinusoidal multi-phase (e.g. three-phase) alternating current (AC) power is provided to the power converter 262. The rotor side power converter 266 converts the AC power provided from the rotor bus 256 into direct current (DC) power and provides the DC power to the DC link 236. As is generally understood, switching elements (e.g. IGBTs) used in the bridge circuits of the rotor side power converter 266 may be modulated to convert the AC power provided from the rotor bus 256 into DC power suitable for the DC link 236.

In addition, the line side converter 268 converts the DC power on the DC link 126 into AC output power suitable for the electrical grid 284. In particular, switching elements (e.g. IGBTs) used in bridge circuits of the line side power converter 268 can be modulated to convert the DC power on the DC link 236 into AC power on the line side bus 288. The AC power from the power converter 262 can be combined with the power from the stator of DFIG 220 to provide multi-phase power (e.g. three-phase power) having a frequency maintained substantially at the frequency of the electrical grid 284 (e.g. 50 Hz or 60 Hz).

Additionally, various circuit breakers and switches, such as grid breaker 282, system breaker 278, stator sync switch 258, converter breaker 286, and line contactor 272 may be included in the wind turbine power system 200 to connect or disconnect corresponding buses, for example, when current flow is excessive and may damage components of the wind turbine 100 or for other operational considerations. Additional protection components may also be included in the wind turbine system 200, such as the crowbar circuit described below.

The power converter 262 can be coupled to a controller 274 to control the operation of the rotor side converter 266 and the line side converter 268. It should be noted that the controller 274, in typical embodiments, is configured as an interface between the power converter 262 and a control system 276. The controller 274 can include any number of control devices. In one implementation, the controller 274 can include a processing device (e.g. microprocessor, microcontroller, etc.) executing computer-readable instructions stored in a computer-readable medium.

More specifically, the power converter 262 may receive control signals from, for instance, the control system 276 via the controller 274. The control signals may be based, among other things, on sensed conditions or operating characteristics of the wind turbine system 200. Typically, the control signals provide for control of the operation of the power converter 262. For example, feedback in the form of a sensed speed of the DFIG 220 may be used to control the conversion of the output power from the rotor bus 256 to maintain a proper and balanced multi-phase (e.g. three-phase) power supply. Other feedback from other sensors may also be used by the controller 274 to control the power converter 262, including, for example, stator and rotor bus voltages and current feedbacks. Using the various forms of feedback information, switching control signals (e.g. gate timing commands for IGBTs), shorting control signals, stator synchronizing control signals, and circuit breaker signals may be generated.

Figure 3:
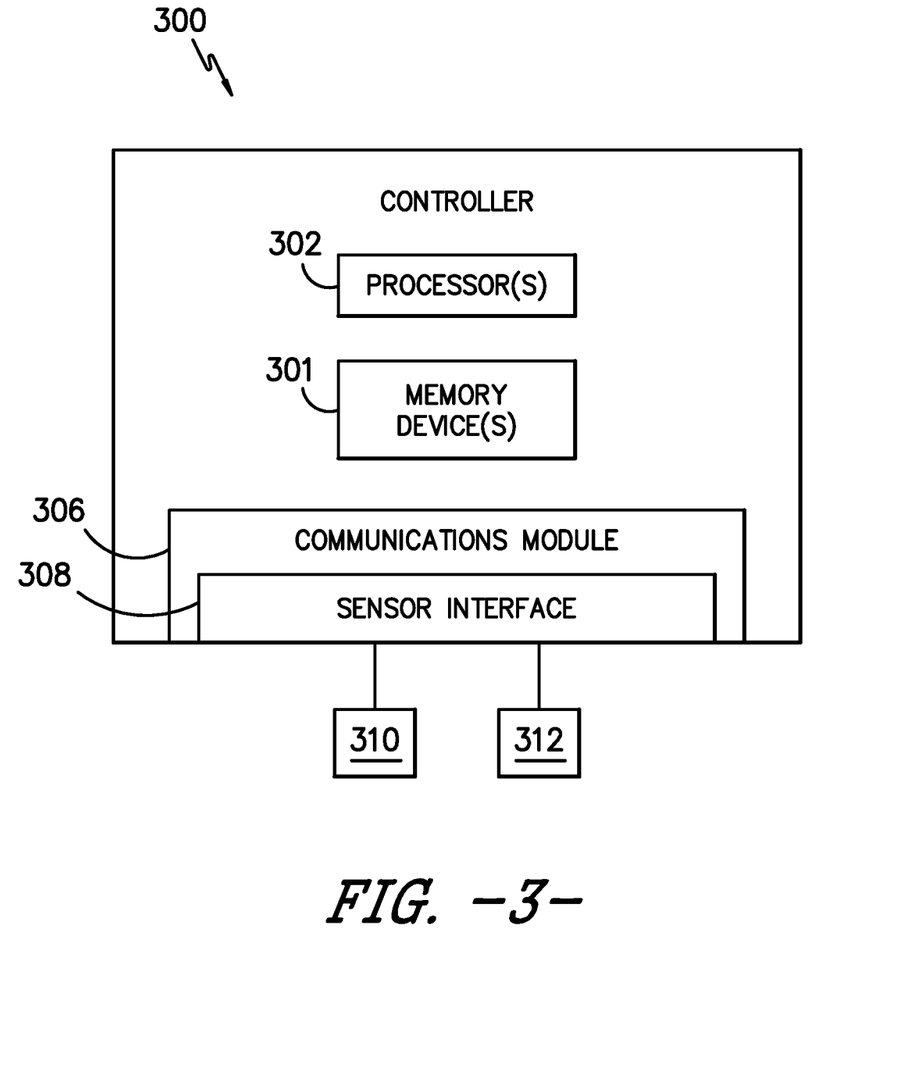
FIG. 3 illustrates a block diagram of one embodiment of a controller that may be used to control operation of a wind turbine according to the present disclosure.

Referring now to FIG. 3, a block diagram of one embodiment of a controller 300, such as the control system 276 or the controller 274, is illustrated. As shown, the controller 300 can include one or more processor(s) 302 and associated memory device(s) 304 configured to perform a variety of computer-implemented functions and/or instructions (e.g., performing the methods, steps, calculations and the like and storing relevant data as disclosed herein). The instructions when executed by the processor(s) 302 can cause the processor to perform operations, including providing control commands to the various system components. For instance, the control commands can include pulse width modulation commands provided to the switching elements of the power converter 262. Additionally, the controller 300 may include a communications module 306 to facilitate communications between the controller 300 and the various components of the wind turbine 100 and/or the power system 200, such as for instance, any of the components of FIGS. 1 and 2. Further, the communications module may include a sensor interface 308 (e.g., one or more analog-to-digital converters) to permit signals transmitted from one or more sensors 310, 312 to be converted into signals that can be understood and processed by the processor(s) 302. It should be appreciated that the sensors 310, 312 may be communicatively coupled to the communications module 306 using any suitable means, such as via a wired or wireless connection. As such, the processor(s) 302 may be configured to receive one or more signals from the sensors 310, 312.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the processor(s) to perform the various functions as described herein.

Figure 4:
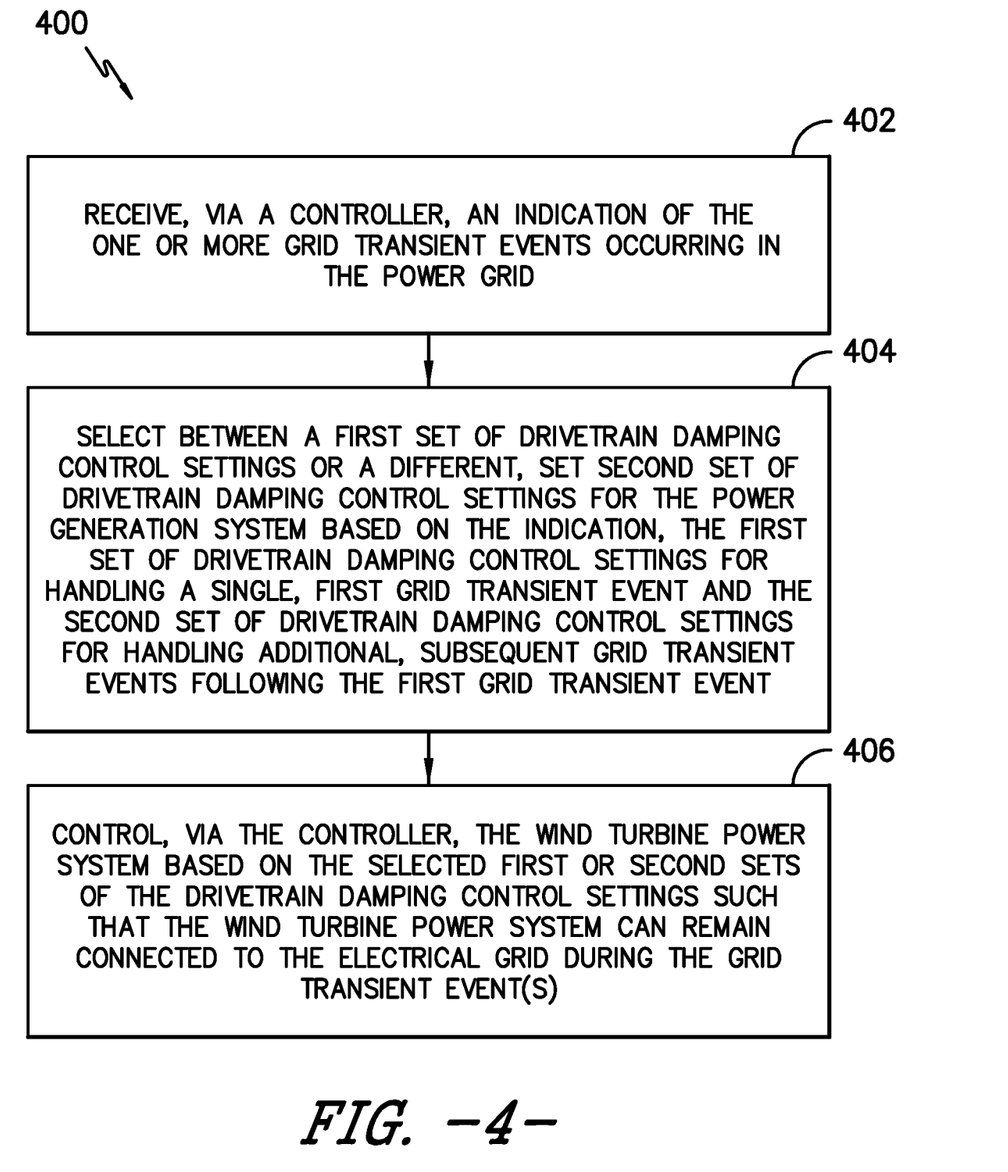
FIG. 4 illustrates a flow diagram of one embodiment of a method for operating a power generation system having a drivetrain connected to an electrical grid during one or more grid transient events according to the present disclosure.

Referring now to FIG. 4, a flow diagram of an embodiment of a method (400) for operating a power generation system connected to an electrical grid 284, such as the wind turbine power system 200 of FIG. 2, during one or more grid transient events is illustrated. The method (400) can be implemented by one or more computing devices, such as the controller 300 of FIG. 3. In addition, FIG. 4 illustrates steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

As shown at (402), the method (400) includes receiving, via the controller 300, an indication of the grid transient event(s) occurring in the electrical grid 284. For instance, a grid transient event, as described herein, is generally associated with a dip in voltage in the electrical grid 284 that can be detected. In particular, the grid transient event can be a low voltage ride through event or a zero voltage ride through event. In some implementations, the grid transient event(s) can be detected based at least in part on data received from various sensors associated with the wind turbine power system 200. In further implementations, there are possible operations where the controller 300 can limit the electrical torque below the torque level before the grid transient event(s) based on other electrical quantities, such as positive sequence voltage angle change, negative sequence voltage magnitude, etc. In such embodiments, the sensor(s) can be configured to monitor various parameters associated with the wind turbine power system 200 and/or the electrical grid 284, such as rotor speed, generator output voltage, rotor current, and/or other suitable parameter. In some implementations, the sensor(s) can be configured to provide data indicative of such monitored parameters to the controller 300. Moreover, in an embodiment, the low voltage ride through event(s) may include a single, first low voltage ride through event occurring in the electrical grid 284 as well as the first low voltage ride through event followed by one or more subsequent, second low voltage ride through events occurring in the electrical grid 284.

As shown at (404), the method (400) includes selecting between a first set of drivetrain damping control settings or a different, set second set of drivetrain damping control settings for the power generation system 200 based on the indication. In such embodiments, the first set of drivetrain damping control settings is for handling a single, first grid transient event, whereas the second set of drivetrain damping control settings is for handling additional, subsequent grid transient events following the first transient event. In particular embodiments, as an example, the first set of drivetrain damping control settings for the first low voltage ride through event may include control settings selected to orient to prioritize power performance, e.g. by reducing power fluctuations in the electrical grid 284. Moreover, in an embodiment, the different, second set of drivetrain damping control settings for the subsequent, second low voltage ride through event(s) may include control settings selected to orient to prioritize reduction of mechanical loads of the drivetrain 230.

Thus, in several embodiments, the controller 300 can first determine whether the low voltage ride through event(s) corresponds to the single, first low voltage ride through event or whether the first low voltage ride through event is followed by one or more subsequent, second low voltage ride through events. In other words, the controller 300 can distinguish between a single low voltage ride through event or multiple fault ride through events, e.g. within a defined time frame. Accordingly, the controller 300 can select between the first and second sets of the drivetrain damping control settings based on the distinction.

Still referring to FIG. 4, as shown at (406), the method (400) includes controlling, via the controller 300, the wind turbine power system 200 based on the selected first or second sets of the drivetrain damping control settings such that the wind turbine power system 200 can remain connected to the electrical grid 284 during the grid transient event(s). In certain embodiments, for example, the drivetrain damping control setting(s) may include a gain and/or a limit of the controller 300. In such embodiments, the method 400 may include tuning at least one of the gain or the limit of the controller 300 based on the selected one or more drivetrain damping control settings.

Referring now to FIG. 5, a schematic diagram of one embodiment of a drivetrain damping algorithm 500 that may be implemented by the controller 300 is illustrated. As shown, the drivetrain damping algorithm 500 is configured to modify the drivetrain damping limits and/or gains programmed in the controller 300 as a function of LVRT_flag and LVRT time (e.g. such as greater than 10 seconds). More particularly, the algorithm 500 starts at an Initial Mode 502. As shown at 504, which corresponds to Mode 0, the drivetrain damping (DTD) algorithm 500 operates without any set limits and the gains are received from the turbine controller (e.g. the controller 300). Thus, Mode 0 generally corresponds with normal or standard operation of the wind turbine power system 200, in which the drivetrain damping algorithm 500 provides oscillation damping to the drivetrain 230.

If the controller 300 receives an indication of a grid transient event (e.g. LVRT_flag), as shown at 506, the DTD algorithm 500 changes operation of the wind turbine power system 200 to First Mode. For example, as shown, the First Mode can be activated after a single low voltage ride through event, and the limits can be set to +/−0.1 with the gains obtained from the turbine controller. Moreover, as shown, the First Mode may correspond to a Power Performance mode, in which control settings are selected to orient to prioritize power performance. Further, as shown, the DTD algorithm 500 may also start a timer to track the duration of the grid transient event between Mode 0 and the First Mode. For the First Mode, the time should be less than a certain amount, such as less than about 10 seconds.

If multiple fault ride through events continue to occur, as shown at 508, the DTD algorithm 500 can then switch to a Second Mode. More specifically, as shown, the Second Mode can be activated after multiple low voltage ride through events, and the limits can be set from about −0.3 to about +0.2 with the gains being set to about 2, as an example. Moreover, as shown, the Second Mode may correspond to a Loads Performance mode, in which control settings are selected to orient to prioritize reduction of mechanical loads of the drivetrain 230. Further, as shown, the DTD algorithm 500 may also start a timer to track the duration of the grid transient event between the First and Second Modes. For the Second Mode, the time generally exceeds about 20 seconds. Thus, by having more actuation of the DTD algorithm 500 during LVRT events, the present disclosure assists in preventing generator speed oscillations after the fault as well as reducing low speed shaft torque values.

Figure 6:
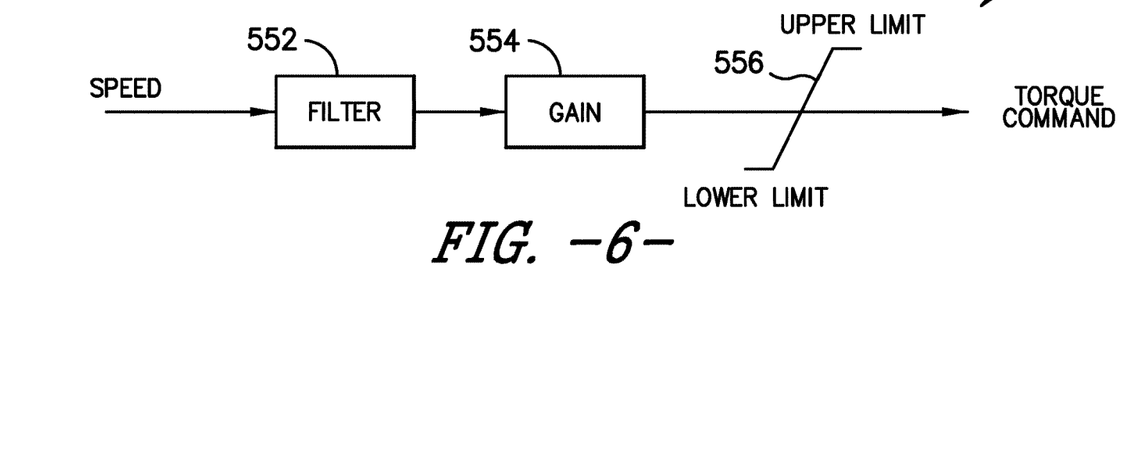
FIG. 6 illustrates a schematic diagram of one embodiment of a damping control scheme indicating application of the gains and limits according to the present disclosure.

Referring now to FIG. 6, a schematic diagram of one embodiment of a damping control scheme 550 indicating application of the gains and limits described herein is illustrated. As shown, inputs to the control scheme 550 may include a rotational speed signal, as an example. As shown at 552, the speed signal may be filtered via one or more filters. As shown at 554, a gain (such as the updated gain described herein) can be applied to the filtered signal. As shown at 556, the limits can then be applied to output from the gain module. Thus, as shown, the output of the control scheme may correspond to a torque command for the converter controller 274.

Figure 7A:
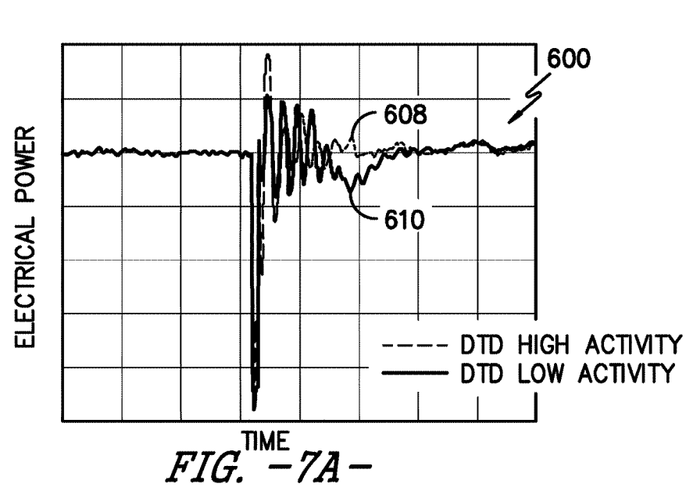
FIGS. 7A-7D illustrate various graphs for the power/torque performance for single LVRT events with different DTD strategies according to the present disclosure.
Figure 7B:
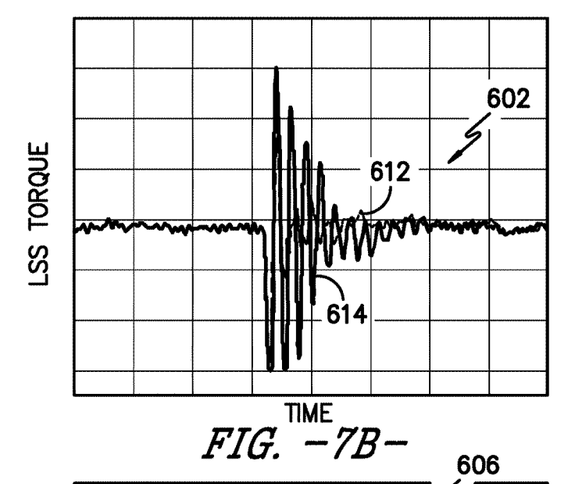
Figure 7C:
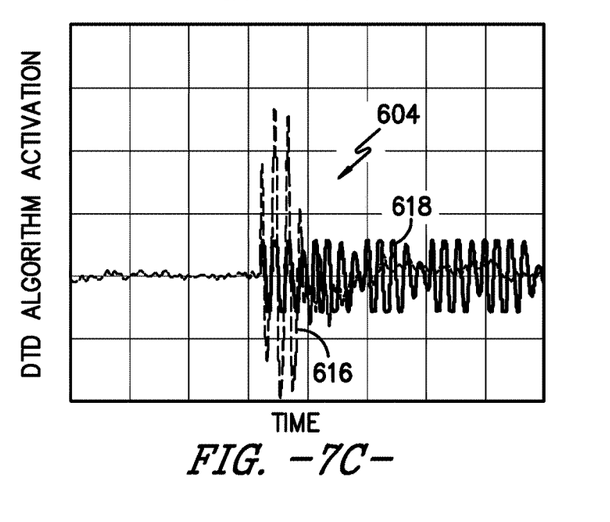
Figure 7D:
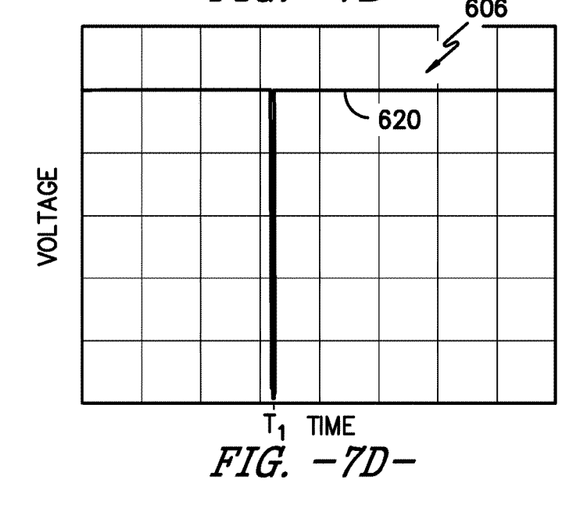

Referring particularly to FIGS. 7A-7D, various graphs for illustrating the power/torque performance for single LVRT events with different DTD strategies are shown. In particular, FIG. 7A illustrates a graph 600 of electrical power (y-axis) versus time (x-axis) according to the present disclosure. Further, FIG. 7A illustrates the electrical power resulting from operating the wind turbine power system 200 based on loads performance 608 and power performance 610, respectively. FIG. 7B illustrates a graph 602 of low-speed shaft (LSS) torque (y-axis) versus time (x-axis) according to the present disclosure. Further, FIG. 7B illustrates the LSS torque resulting from operating the wind turbine power system 200 based on loads performance 612 and power performance 614, respectively. FIG. 7C illustrates a graph 604 of DTD Algorithm Activation (y-axis) versus time (x-axis) according to the present disclosure. Further, FIG. 7C illustrates the activity of the DTD algorithm 500 described herein, e.g. based on loads performance 616 and power performance 618, respectively. Moreover, FIG. 7D illustrates a graph 606 of voltage 620 (y-axis) versus time (x-axis) according to the present disclosure. Accordingly, as shown at time T1 in FIG. 7D, the voltage 620 in the electrical grid 284 dips by a substantial amount for a short duration (which represents a single, low voltage ride through event). Thus, as shown in FIGS. 7A-7C, it is observed that the higher the actuation of the DTD algorithm (FIG. 7C), the higher power over/undershoots (curve 610 as compared to curve 608 of FIG. 7A) and the LSS torque values (curve 614 as compared to curve 612 of FIG. 7B) are reduced.

Figures 8A, 8B:
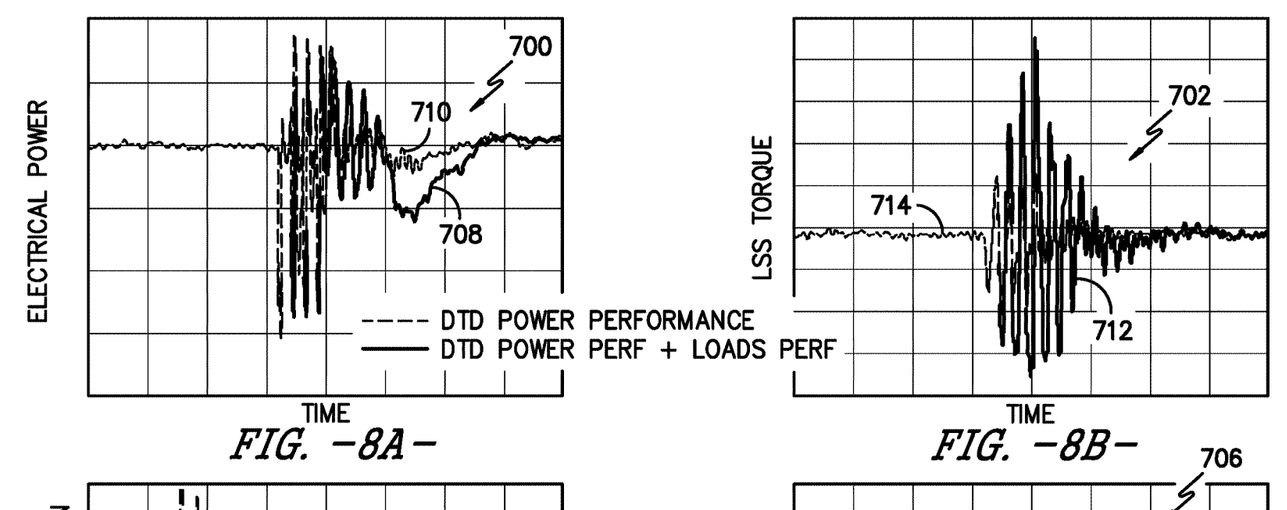
FIGS. 8A-8D illustrate various graphs for the power/torque performance for multiple MFVT events with different DTD strategies according to the present disclosure.
Figure 8C:
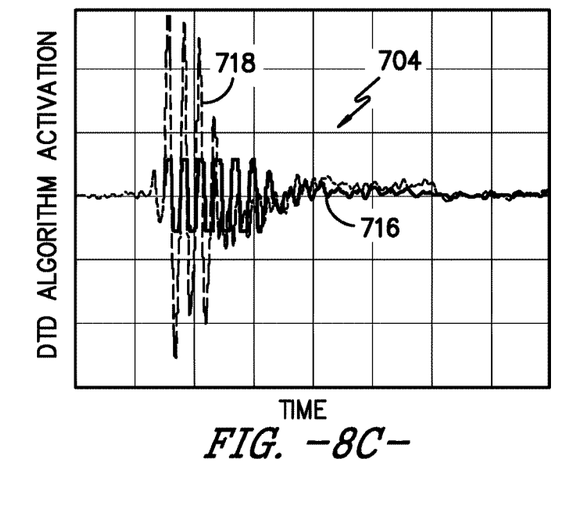
Figure 8D:
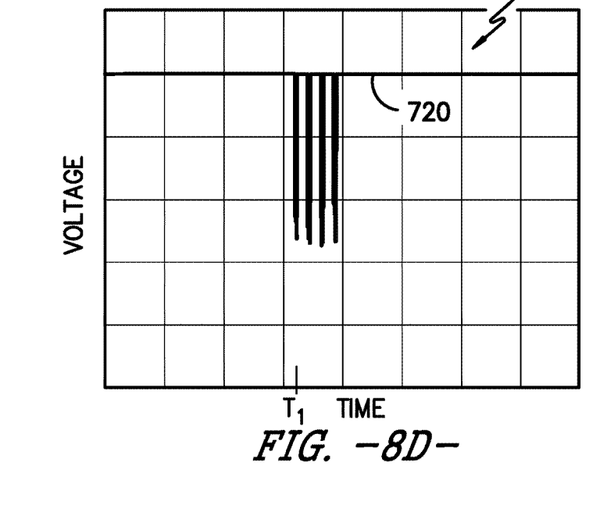

Referring particularly to FIGS. 8A-8D, various graphs for illustrating the power/torque performance for multiple fault ride through (MFRT) events with different DTD strategies are shown. In particular, FIG. 8A illustrates a graph 700 of electrical power (y-axis) versus time (x-axis) according to the present disclosure. Further, FIG. 8A illustrates the electrical power resulting from operating the wind turbine power system 200 based on power performance 708 and a combination 710 of power and loads performance, respectively. FIG. 8B illustrates a graph 702 of low-speed shaft (LSS) torque (y-axis) versus time (x-axis) according to the present disclosure. Further, FIG. 8B illustrates the LSS torque resulting from operating the wind turbine power system 200 based on power performance 712 and a combination 714 of power and loads performance, respectively. FIG. 8C illustrates a graph 704 of DTD Algorithm Activation (y-axis) versus time (x-axis) according to the present disclosure. Further, FIG. 8C illustrates the activity of the DTD algorithm 500 described herein, e.g. based on power performance 716 and a combination 718 of power and loads performance, respectively. Moreover, FIG. 8D illustrates a graph 706 of voltage 720 (y-axis) versus time (x-axis) according to the present disclosure. Accordingly, as shown at starting at time T1 in FIG. 8D, the voltage 720 in the electrical grid 284 dips by a substantial amount for a short duration and is followed by multiple low voltage dips as well (which represents multiple fault ride through events as described herein). Thus, as shown in FIGS. 8A-8C, for MFRT sequences, LSS torque values can build up at every low voltage event (see FIG. 8B), reaching significantly high values. For that, the DTD algorithm described herein may use lower DTD limits and gains for single LVRT events and higher limits and gains for second and subsequent dips.

Figure 9:
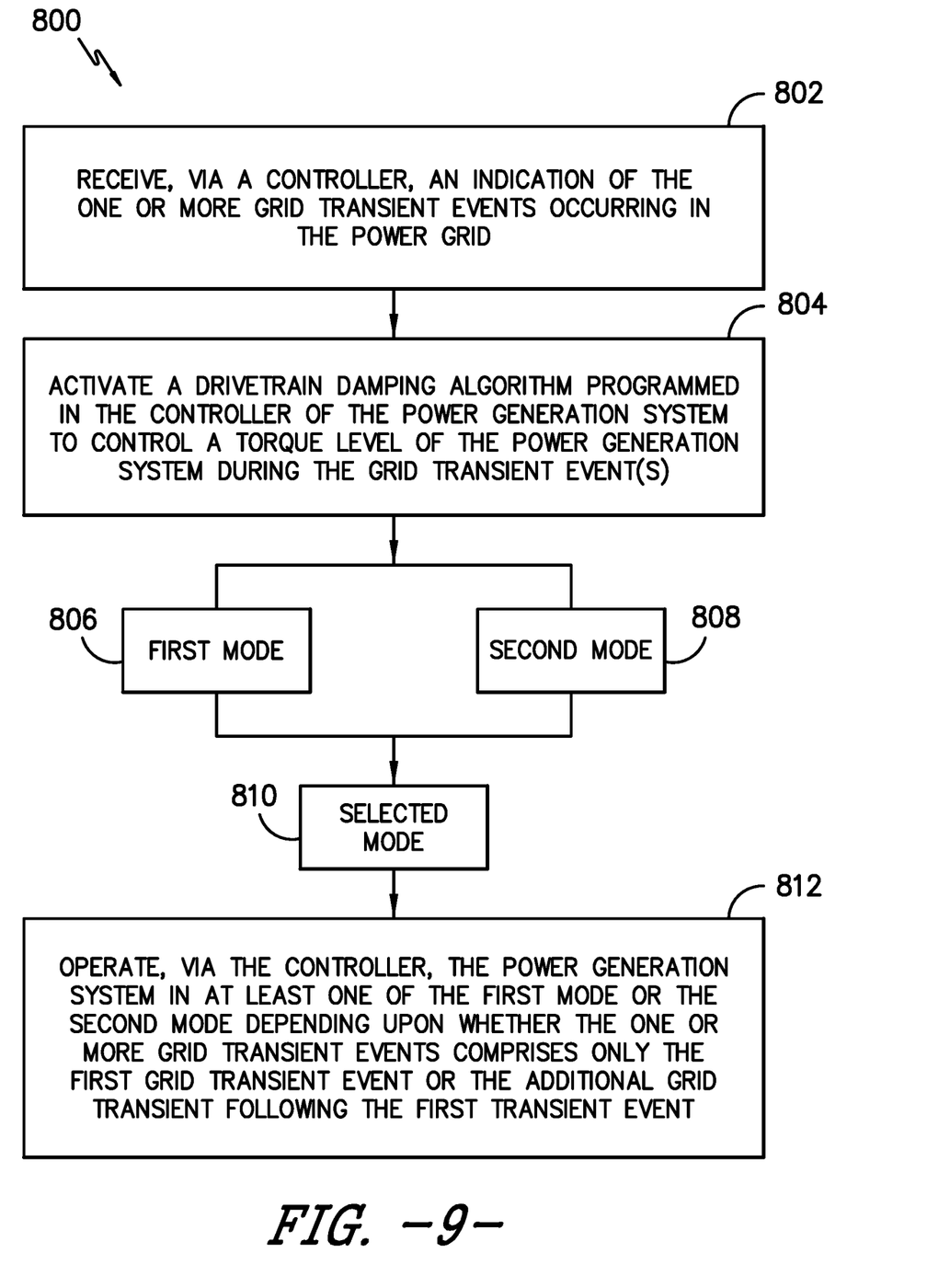
FIG. 9 illustrates a flow diagram of another embodiment of a method for operating a power generation system having a drivetrain connected to an electrical grid during one or more grid transient events according to the present disclosure.

Referring now to FIG. 9, a flow diagram of another embodiment of a method (800) for operating a power generation system connected to an electrical grid 284, such as the wind turbine power system 200 of FIG. 2, during one or more grid transient events is illustrated. The method (800) can be implemented by one or more computing devices, such as the controller 300 of FIG. 3. In addition, FIG. 9 illustrates steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

As shown at (802), the method (800) includes receiving, via the controller 300, an indication of the grid transient event(s) occurring in the electrical grid 284. As shown at (804), the method (800) includes activating a drivetrain damping algorithm programmed in the controller of the power generation system to control a torque level of the power generation system during the grid transient event(s). Further, the drivetrain damping algorithm may include, at least, a first mode (806) defining a first set of drivetrain damping control settings for handling a first grid transient event of the one or more grid transient events and a second mode (808) defining a different, second set of drivetrain damping control settings for handling additional grid transient events of the one or more grid transient events following the first transient event. Thus, as shown at (810), the method (800) may include selecting between the first and second modes (806), (808). Moreover, as shown at (812), the method (800) includes operating, via the controller, the power generation system in the selected mode (808) depending upon whether the one or more grid transient events comprises only the first grid transient event or the additional grid transient following the first transient event.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a power generation system having a drivetrain connected to an electrical grid during one or more grid transient events, the method comprising:
   receiving, via a controller, an indication of the one or more grid transient events occurring in the electrical grid;
   selecting between a first set of drivetrain damping control settings or a different, set second set of drivetrain damping control settings for the power generation system based on the indication, the first set of drivetrain damping control settings for handling a single, first grid transient event of the one or more grid transient events and the second set of drivetrain damping control settings for handling additional, subsequent grid transient events following the first transient event; and,
   controlling, via the controller, the power generation system based on the selected first or second sets of the drivetrain damping control settings such that the power generation system can remain connected to the electrical grid during the one or more grid transient events.

2. The method of claim 1, wherein the one or more grid transient events comprises at least one of one or more low voltage ride through events or one or more zero voltage ride through events.

3. The method of claim 1, wherein receiving the indication of the one or more grid transient events occurring in the electrical grid further comprises:
   receiving a first indication of a single, first grid transient event;
   waiting a certain time period; and
   receiving a second indication of whether the single, first grid transient event is isolated or followed by additional, subsequent grid transient events.

4. The method of claim 3, wherein selecting between a first set of drivetrain damping control settings or a different, set second set of drivetrain damping control settings for the power generation system based on the indication further comprises:
   determining whether the second indication is indicative of the single, first grid transient event being isolated or is followed by the additional, subsequent grid transient events; and
   selecting between the first and second sets of the drivetrain damping control settings based on the determination.

5. The method of claim 1, wherein the first set of drivetrain damping control settings for handling the single, first grid transient event comprises control settings selected to orient to prioritize power performance.

6. The method of claim 1, wherein the different, second set of drivetrain damping control settings for handling additional, subsequent grid transient events following the first transient event comprises control settings selected to orient to prioritize reduction of mechanical loads of the drivetrain.

7. The method of claim 1, wherein the first and second sets of drivetrain damping control settings further comprises at least one of a gain or a limit of the controller.

8. The method of claim 7, further comprising:
   tuning at least one of the gain or the limit of the controller based on the selected first or second sets of drivetrain damping control settings.

9. The method of claim 7, wherein, for the first set of drivetrain damping control settings, the method further comprises:
   applying upper and lower limits to the controller, reducing the gain to zero, and then subsequently gradually increasing the gain thereafter; and,
   wherein, for the second set of drivetrain damping control settings, the method further comprises applying upper and lower limits to the controller and setting the gain to at least one (1).

10. The method of claim 1, wherein the power generator system comprises a wind turbine power system.

11. A method for operating a power generation system having a drivetrain connected to an electrical grid during one or more grid transient events, the method comprising:

receiving, via a controller, an indication of the one or more grid transient events occurring in the electrical grid;

activating a drivetrain damping algorithm programmed in the controller of the power generation system to control a torque level of the power generation system during the one or more grid transient events, wherein the drivetrain damping algorithm comprises, at least, a first mode defining a first set of drivetrain damping control settings for handling a single, first grid transient event and a second mode defining a different, second set of drivetrain damping control settings for handling additional, subsequent grid transient events of following the first transient event; and operating, via the controller, the power generation system in at least one of the first mode or the second mode depending upon whether the one or more grid transient events comprises only the first grid transient event or the additional, subsequent grid transient following the first transient event.

12. The method of claim 11, wherein the first set of drivetrain damping control settings for handling the single, first grid transient event comprises control settings selected to orient to prioritize power performance, and the different, second set of drivetrain damping control settings for handling additional, subsequent grid transient events following the first transient event comprises control settings selected to orient to prioritize reduction of mechanical loads of the drivetrain.

13. A wind turbine power system connected to an electrical grid, comprising:

a tower;

a nacelle mounted atop the tower;

a rotor comprising a rotatable hub having at least one rotor blade mounted thereto;

a drivetrain mechanically coupled to the rotor, the drivetrain comprising a rotor shaft, a gearbox, and a generator; and a controller configured to perform a plurality of operations, the plurality of operations comprising:

receiving an indication of the one or more grid transient events occurring in the electrical grid;

selecting between a first set of drivetrain damping control settings or a different, set second set of drivetrain damping control settings for the power generation system based on the indication, the first set of drivetrain damping control settings for handling a single, first grid transient event of the one or more grid transient events and the second set of drivetrain damping control settings for handling additional, subsequent grid transient events following the first transient event; and, controlling the power generation system based on the selected first or second sets of the drivetrain damping control settings such that the power generation system can remain connected to the electrical grid during the one or more grid transient events.

14. The wind turbine power system of claim 13, wherein the one or more grid transient events comprises at least one of one or more low voltage ride through events or one or more zero voltage ride through events.

15. The wind turbine power system of claim 14, wherein receiving the indication of the one or more grid transient events occurring in the electrical grid further comprises:

receiving a first indication of a single, first grid transient event;

waiting a certain time period; and receiving a second indication of whether the single, first grid transient event is isolated or followed by additional, subsequent grid transient events.

16. The wind turbine power system of claim 14, wherein selecting between a first set of drivetrain damping control settings or a different, set second set of drivetrain damping control settings for the power generation system based on the indication further comprises:

determining whether the second indication is indicative of the single, first grid transient event being isolated or is followed by the additional, subsequent grid transient events; and selecting between the first and second sets of the drivetrain damping control settings based on the determination.

17. The wind turbine power system of claim 13, wherein the first set of drivetrain damping control settings for handling the single, first grid transient event comprises control settings selected to orient to prioritize power performance.

18. The wind turbine power system of claim 13, wherein the different, second set of drivetrain damping control settings for handling additional, subsequent grid transient events following the first transient event comprises control settings selected to orient to prioritize reduction of mechanical loads of the drivetrain.

19. The wind turbine power system of claim 13, wherein the first and second sets of drivetrain damping control settings further comprises at least one of a gain or a limit of the controller.

20. The wind turbine power system of claim 19, wherein, for the first set of drivetrain damping control settings, the method further comprises:

applying upper and lower limits to the controller, reducing the gain to zero, and then subsequently gradually increasing the gain thereafter; and, wherein, for the second set of drivetrain damping control settings, the method further comprises applying upper and lower limits to the controller and setting the gain to at least one (1).

* * * * *